Oct. 23, 1956 C. R. FOUTZ 2,767,693
METHOD AND APPARATUS FOR PRODUCING AND MAINTAINING A
GAS-FREE DIELECTRIC LIQUID COOLING MEDIUM
Filed May 20, 1952 8 Sheets-Sheet 4

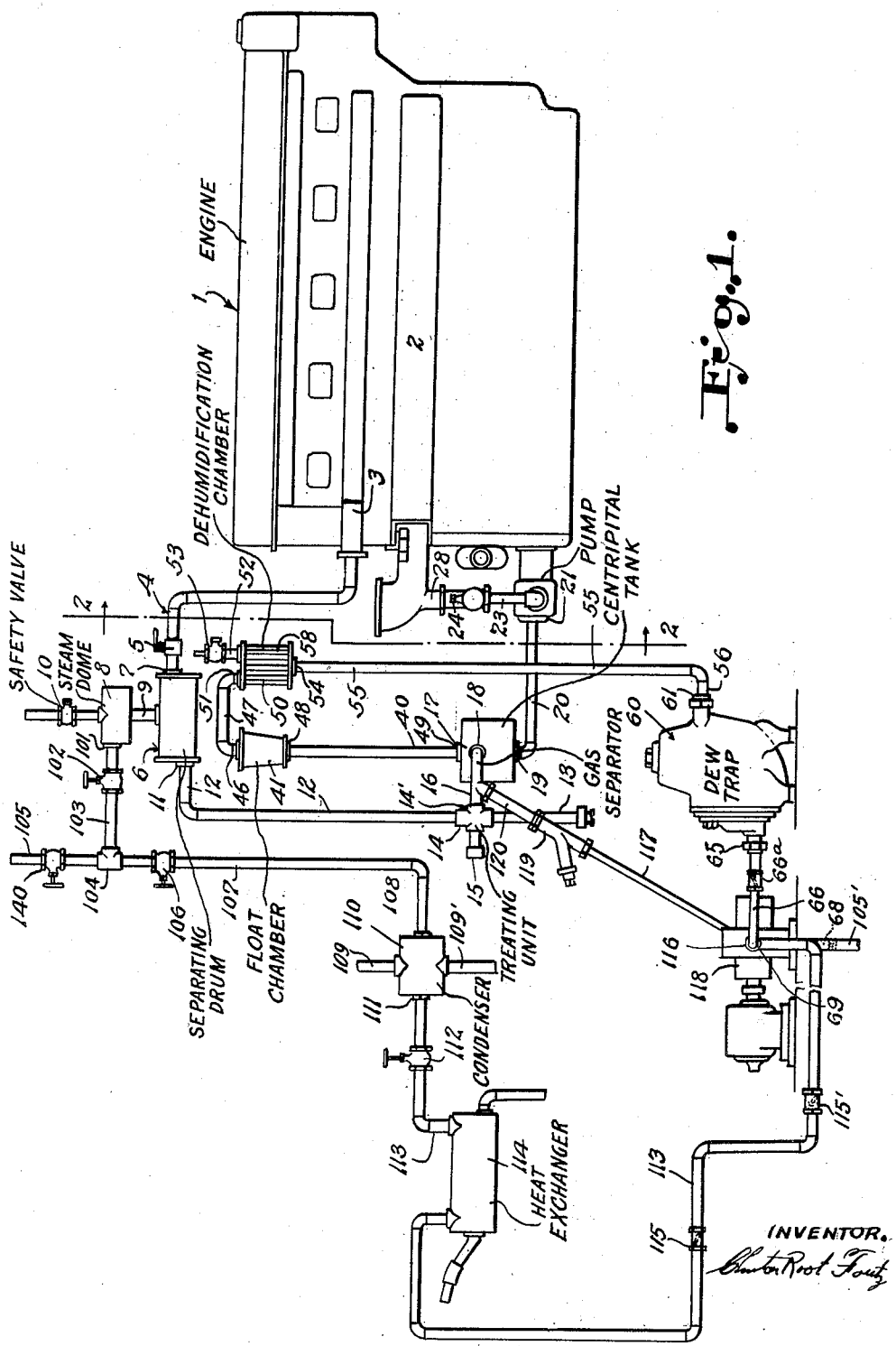

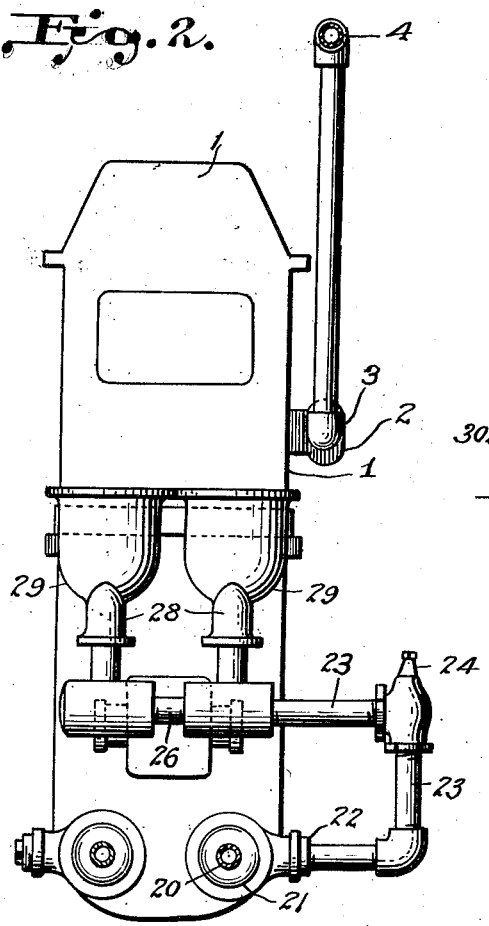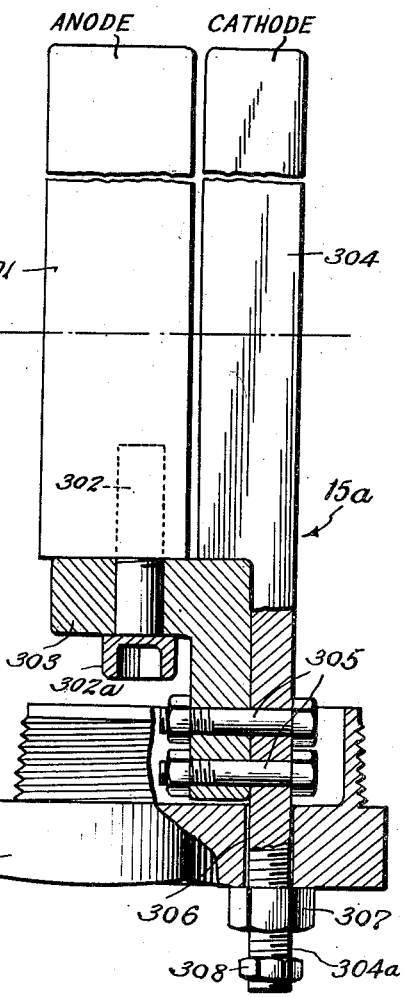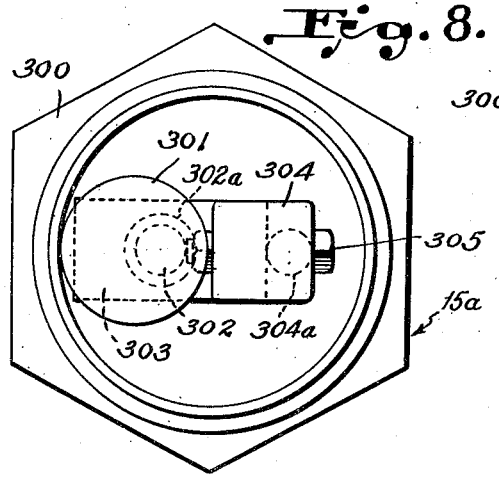

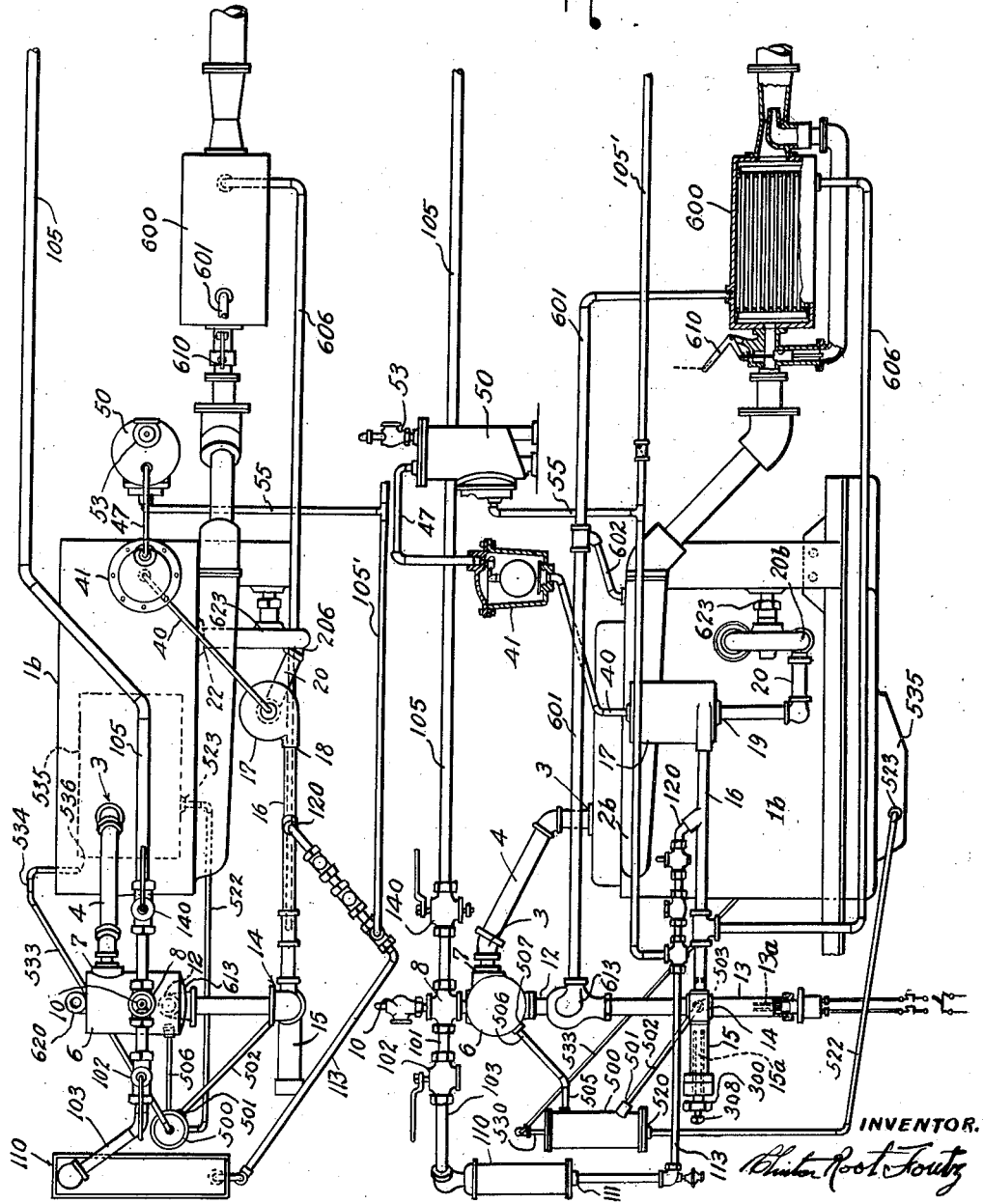

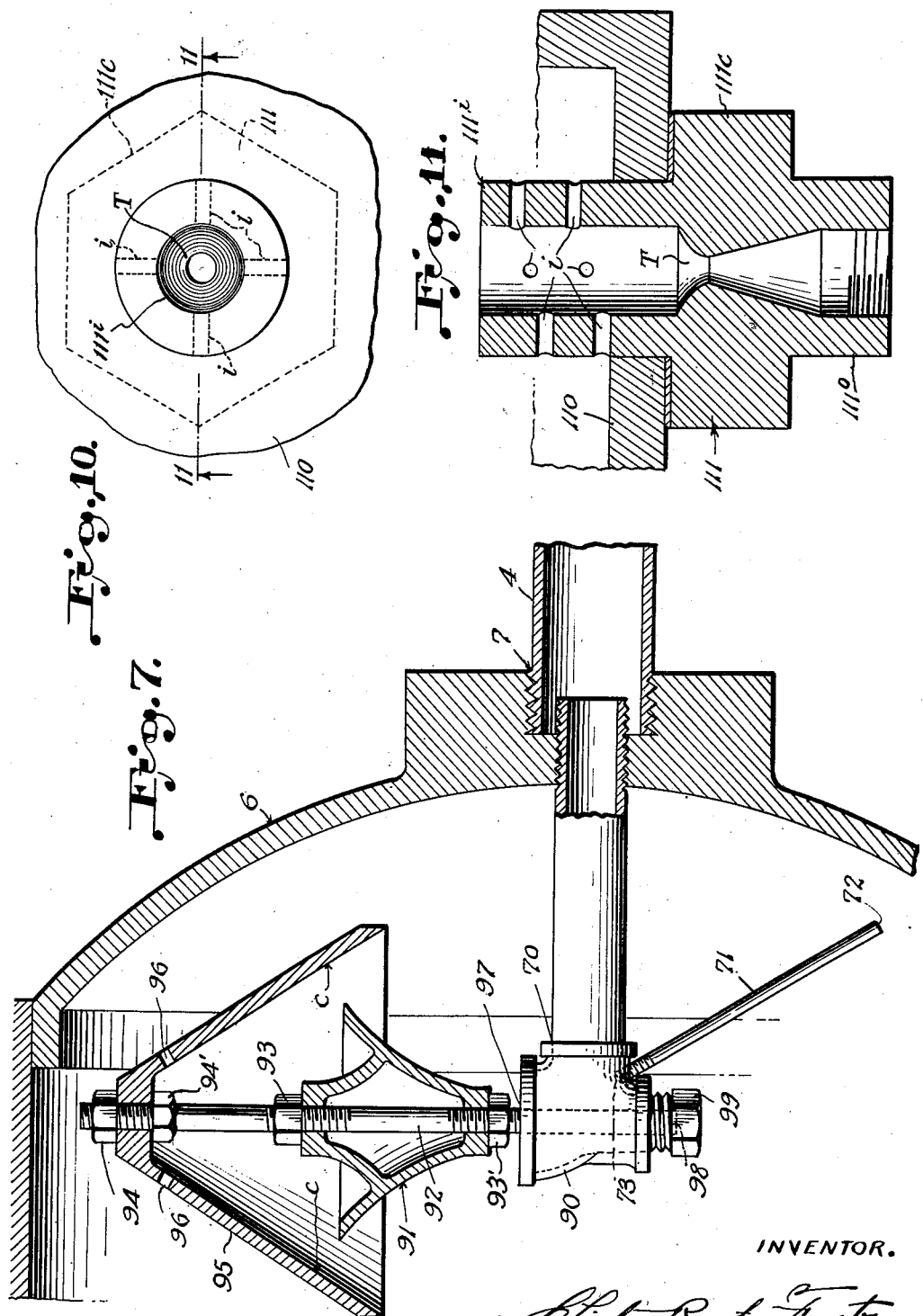

INVENTOR.
Clinton Root Foutz

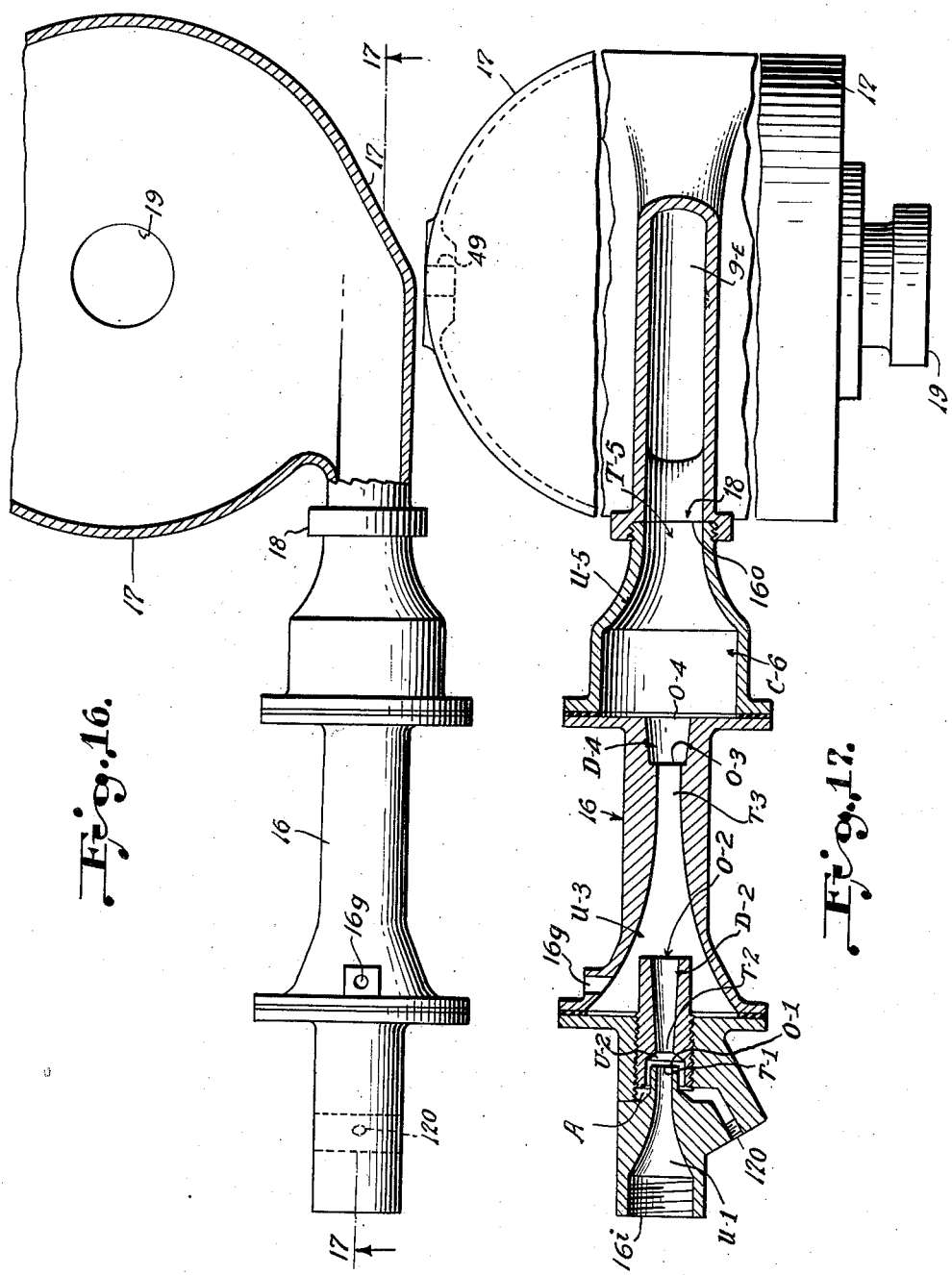

United States Patent Office 2,767,693
Patented Oct. 23, 1956

2,767,693

METHOD AND APPARATUS FOR PRODUCING AND MAINTAINING A GAS-FREE DIELECTRIC LIQUID COOLING MEDIUM

Clinton Root Foutz, Washington, D. C.

Application May 20, 1952, Serial No. 288,986

12 Claims. (Cl. 123—41.25)

This invention relates to a method of and apparatus for cooling water jackets of engines or the like, and more particularly to such methods of and apparatus for providing and maintaining a gas-free dielectric liquid cooling medium.

The cooling methods and apparatus for engines and the like heretofore known and in use do not afford maximum efficiency and as a consequence, limited maximum water jacket temperatures of 240° are necessary. This temperature limitation is necessary because of turbulent flow and gas emulsification in the system, the lack of deaeration of and the electrolytic action of the coolant. These factors preclude efficient heat transfer and create undesirable effects on the apparatus. With the advent of nuclear powered apparatus, the known systems become completely inadequate.

Having in mind the defects of the prior art methods and apparatus, it is the primary object of the present invention to provide a method of and apparatus for properly cooling the water jackets of engines, or the like, at a much higher water jacket temperature.

It is another object of the invention to provide a method of and apparatus for producing and maintaining during use, a deaerated liquid cooling medium.

It is still another object of the invention to provide a method of and apparatus for producing and maintaining during use a deaerated liquid cooling medium that is free of noncondensable gases.

It is a further object of the invention to provide a method of and apparatus for producing and maintaining during use a chemically neutral, dielectric liquid cooling medium.

It is a still further object of the invention to provide a method of and apparatus for producing and maintaining a dielectric, gas-free liquid cooling medium.

It is yet another object of the invention to provide a method of and apparatus for cooling water jackets at higher temperatures and having simplicity of organization, economy, and efficiency in operation.

The foregoing objects and others ancillary thereto are accomplished, in accordance with the present invention, by providing the method steps of and apparatus means for circulating a coolant through a closed, substantially airtight system including a water jacket, which comprises dispersing heat from the coolant as it leaves the jacket by vaporization, separating the liquid component and condensing the vapor component, neutralizing the liquid component and adding the condensate (which is neutralized by distillation) thereto, separating gas particles from the liquid to remove the soluble gases, deaerating the separated liquid to remove the saturated gases, condensing the saturated gases to recover the vapor liquid and venting the gases while returning the dew liquid to the coolant, and returning the dielectric gas-free liquid coolant to the water jacket. Heat, independent of the water jacket may be supplied in the system for heating the coolant to heat the engine by reverse thermodynamic circulation.

The novel features that are considered characteristic of the invention are set forth with particularity in the appended claims. The invention itself, however, both as to its organization and its method of operation, together with additional objects and advantages thereof, will best be understood from the following description of a specific embodiment when read in connection with the accompanying drawings, wherein like reference characters indicate like parts throughout the several figures and in which:

Figure 1 is a side view in elevation of an internal combustion engine provided with a cooling system, diagrammatically shown, in accordance with the present invention;

Figure 2 is an enlarged cross-sectional view corresponding to line 2—2 of Figure 1;

Figure 4 is a side view in elevation, partially in section, of a boiler provided with a modified system for producing a gas-free dielectric coolant according to the invention;

Figure 5 is a top plan view of another engine and modified cooling system;

Figure 6 is a side view in elevation, partially in section, of the apparatus shown in Fig. 5;

Figure 7 is an enlarged, fragmentary cross-sectional view taken on a vertical plane through the means for separating the vapor from the liquid of the coolant;

Figure 8 is a plan view of an anodic-cathodic couple employed in the system;

Figure 9 is a view in elevation, partially in section of the anodic-cathodic couple shown in Figure 8;

Figure 10 is an enlarged top plan view of a portion of the bottom wall of a vapor condenser with a special outlet fitting;

Figure 11 is a cross-sectional view corresponding to line 11—11 of Fig. 10;

Figure 16 is an enlarged top plan view, partially in cross-section, of the gas separating apparatus in the system, and Figure 17 is a cross-sectional view corresponding to line 17—17 of Fig. 16.

Figure 3:
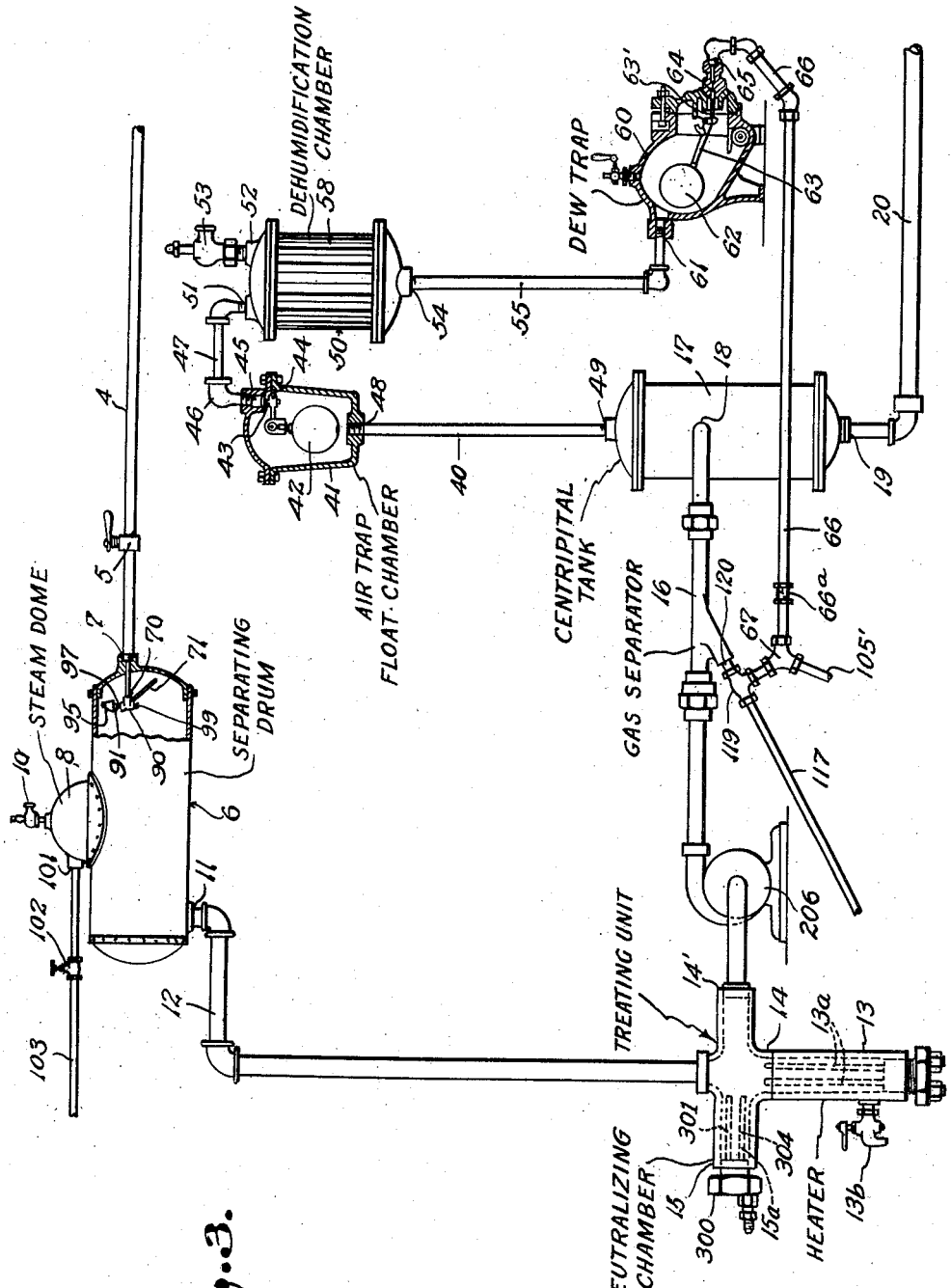
Figure 3 is an enlarged view in elevation, partially in section, of a portion of the cooling system shown in Fig. 1 and including a modification.
Figure 12:
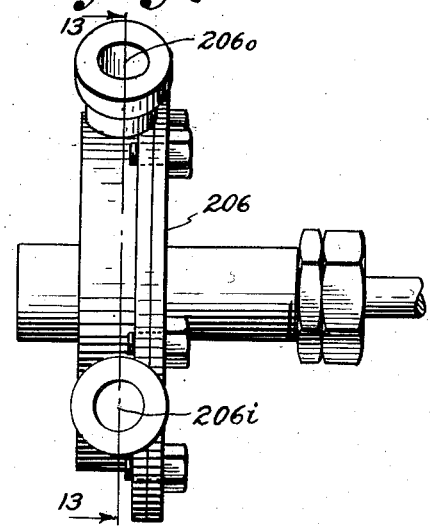
Figure 12 is a view in elevation of a peripheral inlet centrifugal pump.
Figure 13:
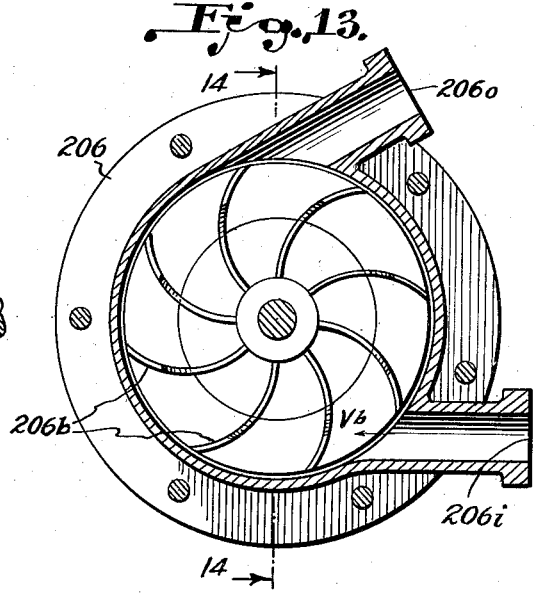
Figure 13 is a cross-sectional view corresponding to line 13—13 of Fig. 12.
Figure 14:
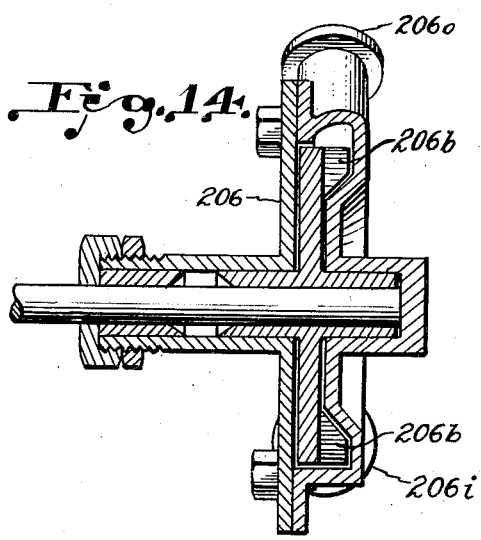
Figure 14 is a cross-sectional view corresponding to line 14—14 of Fig. 13.
Figure 15:
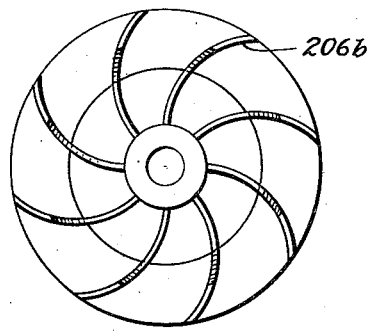
Figure 15 is a side view in elevation of the impeller of the pump shown in Figs. 12-14.

Referring now to the drawings, specifically to Fig. 1, an internal combustion engine 1, which is illustrated as a conventional opposed piston type diesel engine of the marine type and such as used on rail cars, is provided with the usual water jacket manifold 2 having an outlet 3 connected with a discharge pipe 4 for delivering the coolant to a heat exchange apparatus.

In accordance with the present invention, the pipe 4 is connected through a petcock 5 to the inlet 7 of a vapor separating drum 6. The hot coolant is separated in the drum 6 into its liquid and vapor components and the liquid is discharged through an outlet 11 to a pipe 12 and the vapor is discharged through an outlet 9 to a steam dome 8 to be degasified.

To effect the vapor-liquid separation in the drum 6, as best shown in Fig. 7, a pipe 70 is connected with the drum inlet 7 so that it has direct communication with the engine discharge pipe 4. The pipe 70 is supported substantially horizontally within the drum 6 and is provided at its inner, free, end with a T-fitting 90 having its branches disposed vertically. The upper branch of the fitting 90 is open and, preferably, is somewhat larger than the lower branch thereof to provide a relatively large outlet 97. A plug 99 is threaded in the lower branch of the fitting 90 and a threaded rod 92 is mounted vertically within the branches and has its lower end threaded in a socket 98 in the plug 99.

An inverted cone 91, having curved surfaces longitudinally, is mounted on the rod 92, slightly above the outlet 97 and is selectively fixed by nuts 93, 93'. A somewhat larger conical shell 95 is also selectively fixed on the rod 92 by nuts 94, 94' and is disposed in an upright postion with the lower portion of its skirt surrounding in spaced relation, and extending below, the upper end of the inverted cone 91. A small tube 71 is inserted through the bottom of the fitting 90 and extends downwardly so that its lower end 72 is disposed below the normal liquid level in the tank 6 and the upper end 73 of said tube is open to the interior of the fitting 90. It will be noted at this time that the large outlet 97 of the fitting 90 is above the liquid level in the tank 6.

When the coolant flows into the fitting 90 through the pipe 70, a portion of the liquid component thereof discharges through the tube 71 while the major portion is discharged upwardly through the outlet 97, striking the cones 91 and 95 and separating into liquid and vapor components. The liquid collects in the lower portion of the tank 6 to flow through the outlet 11 and the vapor collects in the upper part of the tank 6 and rises through the outlet 9 to the steam dome 8. The outlet 11 is located in the lower part of the tank 6 so as to be below the liquid level therein and the liquid discharges through the outlet 11 both by gravity and vapor pressure within the tank 6.

The liquid emerging through the outlet 11 from the tank 6 flows down the pipe 12 which preferably extends substantially vertically and is connected at its lower end to a treating unit 14 that comprises a housing which is in the nature of a four-way fitting. As best shown in Fig. 3, the inlet connection from the pipe 12 is at the top of the treating unit 14 and immediately thereunder is a heating chamber 13 which contains an electric immersion heating element 13a of well known structure. An outlet valve 13b may be provided in the chamber 13 for draining purposes. At one side of the unit 14 is a neutralizing chamber 15, containing an anodic-cathodic couple 15a (Figs. 3, 8 and 9) for chemically neutralizing the liquid and rendering it dielectric, and the outlet 14' is at the other side of the unit 14.

The anodic-cathodic couple 15a in the neutralizing chamber 15, as shown in Figs. 8 and 9, preferably is carried by a plug 300 for closing the chamber 15 and enabling ready insertion or removal of the couple. The couple comprises an anode 301 formed by a round metal bar having a threaded socket 302 eccentrically disposed in one end for receiving a bolt 302a. The anode 301 is secured by the bolt 302a to an angle bracket 303 that is, in turn, secured to a cathode 304 by bolts 305. The cathode 304 is formed of a square metal bar having a threaded stem 304a which is inserted through a bore 306 in the plug 300 and secured by a nut 307, a second nut 308 being provided for connecting the couple for operation. The eccentric mounting of the anode 301 enables accurate adjustment of the space or gap between the anode 301 and cathode 304 by simple rotation of the anode.

The outlet 14' from the unit 14 is connected to a gas separator unit 16 which feeds through a peripheral inlet 18 into a centripetal tank 17. Any non-condensible gases are separated by the unit 16 and these gases are removed from the liquid in the tank 17 so that only gas-free liquid is discharged through the tank outlet 19 and the supply line 20 to the circulating pump 21 driven by the engine 1. To provide efficiency in operation, the gases removed in the tank 17 are treated to recover the condensate and both this condensate and that from the initially separated vapor are returned to the system through the gas separator 16 so as to insure only gas-free liquid coolant being returned to the engine water jacket.

To recover the condensate from the vapor which is initially separated in the separation tank 6, the vapor passes upwardly through the outlet 9 to the steam dome 8, the latter being provided with a safety blow-off valve 10 which is sealed against the admission of air into the system. The dome 8 has an outlet 101 controlled by a valve 102 and is connected by a pipe 103 to a T-connection 104. One branch 105 of the connection 104 is controlled by a valve 140 and may be used for auxiliary purposes such as in railway car and bus heaters (not shown), while the other branch 107 is controlled by a valve 106 and connected to the inlet 108 of a condenser 110.

The condenser 110 may be provided with a conventional cooling coil connected with pipes 109, 109' and it has a special outlet fitting 111 which is best shown in Figs. 10 and 11. The fitting 111 is designed to maintain continuous outflow of condensate and noncondensable gases, if present, and thereby prevent either the gas or liquid being trapped or retained within the condenser. Although the fitting 111 is shown as being in an end wall in the diagrammatic layout of Fig. 1, it is preferably disposed vertically in the bottom wall of the condenser 110, as illustrated in Fig. 11.

The fitting 111 comprises a tubular member having an inlet end 111i and an outlet end 111o. Preferably, a collar 111c is provided intermediate the ends and the inlet end 111i is threaded into the bottom wall of the condenser 110 to provide an airtight seal. The inlet end 111i preferably extends into the condenser 110 a distance equal to three to five times the diameter of the passage therethrough and a plurality of radially extending, circumferentially and longitudinally spaced inlet holes i are provided in the inlet end portion 111i, the innermost hole i being substantially even with the inner wall of the condenser 110. A vena-contracta throat T is provided in the passage through the fitting 111 to produce a high velocity flow of the liquid therethrough.

The discharge of the liquid condensate or distillate from the condenser outlet 111 is controlled by a valve 112 and fed by a pipe 113, provided with two non-return check valves 115, 115', to the inlet 116 of a pump 118. If desired, a heat exchanger 114 may be interposed in the line 113 for heating the engine oil or the like. The auxiliary branch 105 is connected through any auxiliary units, such as heaters, with a return line 105' which is connected by connection 68 with the condensate return line 113 and thereby maintains a closed circuit. The liquid condensate is fed by the pump 118 through a line 117 to an auxiliary inlet 120 of the gas separator 16. The cooled condensate is mixed with the high temperature liquid from the unit 14 and any noncondensable gases are separated in the unit 16 and removed in the tank 17.

The structure of the gas separator 16 will now be described, reference being made to Fig. 17. The gas separator 16 has an inlet 16i, which is connected with the outlet of the unit 14, and comprises a dual-throat venturi and dual vena-contracta axially aligned with said inlet. The inlet 16i opens to an upstream cone U–1 which tapers to a throat T–1 that terminates in an outlet O–1 and is surrounded by an annular chamber A which is in communication with the condensate inlet 120. The annular chamber terminates forwardly of the outlet O–1 in an upstream cone U–2 that terminates in a throat T–2 and emerges directly into a downstream cone D–2 that terminates in an outlet O–2, completing the dual-throat venturi.

The outlet O–2 is surrounded by an upstream cone U–3 which forms a low pressure chamber behind the outlet O–2 and may be provided with an opening 16g for connection with a pressure gauge or may be closed by a plug. The upstream cone U–3 merges into a throat T–3 that is provided with a substantial length of uniform diameter. The throat T–3 terminates in an outlet O–3 of the same diameter as the throat and which opens into an enlarged downstream cone D–4 that terminates in an outlet O–4.

This outlet O-4 opens into an enlarged chamber C-6 that is provided with an upstream cone U-5 which merges into a throat T-5 that terminates in the detrainer outlet 16o which may be connected to the inlet 18 of the centripetal tank 17.

The non-condensable gases are separated from the liquid by passage through the separator 16 and are injected peripherally into the tank 17 so as to prevent turbulence and permit the gases to rise in the tank while the liquid settles and flows through the outlet 19. The separated gases rise from the tank 17 and pass through the tank outlet 49 and up and upwardly extending pipe 40 to the inlet 48 in the bottom wall of an air trap float chamber 41 having an outlet 46 in its top wall. The outlet 46 is controlled by a needle valve 45 (Fig. 3) having a valve seat 43 cooperative with a valve member 44 which is actuated by a float 42. The float chamber 41 is disposed below the level of the separation tank 6 so as to be subject to a static pressure head.

The column or pipe 40 is normally filled with liquid by the static pressure head and there is liquid in the chamber 41 to lift the float 42 and close the valve 45. As the gases arise into the chamber 41 they collect in the top of the chamber until they create sufficient pressure to lower the liquid level and the float 42 so that the valve 45 is opened. This gas then escapes through the outlet 46 and this relieves the pressure within the tank 41 so that the liquid level rises and lifts the float 42 which closes the valve 45.

The outlet 46 of the float chamber 41 is connected by a pipe 47 with the inlet 51 of a dehumidification chamber 50. The inlet 51 is in the top of the chamber 50 and an outlet 52 is also in the top of the chamber. The outlet 52 is closed by a pressure relief valve 53 which is operable at low pressures and is preferably adjustable. The chamber 50 preferably has ribs or fins 58 on both its inner and outer walls to expedite heat exchange and condensation, and a condensate outlet 54 is provided in the bottom of the chamber.

The condensate outlet 54 is connected by a drip line 55 with the inlet 61 of a dew trap 60 having an outlet 65 controlled by a valve 64 which is actuated by a float 62 and linkage 63. The condensate from the dehumidification tank 50 drips down the line 55 and collects in the trap 60 until the level of the collected dew or condensate is high enough to lift the float 62 and open the valve 64. The outlet 65 is connected with a dew return line 66 having a check valve 66a therein. The dew return line 66 may be connected with the condensate return line 113 by a T-connection 69, as shown in Fig. 1, or it may be connected directly with the condensate return pressure line 117 by three-way connections 67 and 119, as shown in Figure 3.

The foregoing system is arranged as a closed circuit so as to preclude admission of air or other gases. To supply make-up water or other coolant liquid, a three-way connection 119 is provided in the condensate return line 117 as shown in Fig. 1, to provide a sealed branch adapted for connection with a water line or other coolant supply. Conversely, if the connection 119 is employed for returning condensate from the dew trap 60, as shown in Fig. 3, the free branch of the connection 67 may be coupled with the coolant supply.

It will be noted that liquid from the treating unit 14 and the condensate recovered both from the original vapor and subsequently separated gas vapor are combined before passing through the separator 16 and centripetal tank 17 so that any gas is definitely removed. The gas-free liquid is then supplied from the central outlet 19 of the centripetal tank 17, through the pipe 20 to the circulating pump 21 which may be the regular engine circulating pump. The pump outlet 22 is connected by a supply pipe 23, provided with a gauge connector 24, to dual connection 26 with the inlets 28 of two water jacketed exhaust manifolds 29, the jackets of which are connected with the water jacket of the engine 1.

The drawings are more or less schematic and the various parts are shown in various forms in different figures but these variations are not necessarily intended as species of the invention. For example, the steam dome 8 is shown in Fig. 1 as a chamber separate from the tank 6 while in Fig. 3 it is shown as a dome-like chamber formed on the top of the tank 6. In addition to the variation of the make-up water inlet as previously described, a circulating pump 206 may be introduced between the outlet 14' of the treating unit 14 and the inlet of the detrainer 16, as shown in Fig. 3, either as a substitute for or auxiliary to the engine pump 21.

Describing now the operation of the foregoing apparatus, and starting with the initial operation, water is admitted at the inlets in connections 119 or 67 which are then plug-closed after the water has reached the right level, shown by gauge 7' on tank 6 (Fig. 4). At the time of filling, no water could enter the condenser or condensate line, this being prevented by the two non-return check-valves 115, 115' in the condensate line 113 between the condenser 110 and the make-up water inlet. Water has now filled all components of the water-jacket circulation system including the air trap 41. The vent valve 45 is now held closed by the float 42 which is lifted by the water filling the trap 41. The sensible heat transfer circulating system is now ready for starting the engine.

The engine is now started as is the water-jacket circulating centrifugal pump 21 and/or pump 206, and the condensate pump 118. The pump 21 forces the cold water into, through and out of the water jacket outlet 3 through pipe 4 and open valve 5 into the separating tank 6, the water then flowing from the tank 6 into coolant return pipe 12, treating unit 14 and into the separator 16. The separated gas and liquid passes into the centripetal tank 17 and, due to its flow velocity, angular deflection and greater density, the water circumferentially descends in the tank 17 and emerges at the bottom center of the cylindrical tank through outlet 19 and then through pipe 20 to the engine water jacket circulating pump 21.

The water has been degasified and the liquid and separated soluble gas is in a dispersed state when entering the centripetal tank 17 at the half peripheral height inlet 18. The centripetal flow of the fluids in the tank 17 causes the separated gas or air to move toward the top center outlet 49 and the air bubbles then ascend through pipe 40 and inlet 48 into the air trap 41. Each time sufficient air collects in the trap 41, it will displace the liquid, lowering the water level and the ball-float 42 which will open the valve 45 and vent the air and gases through the outlet 46, pipe 47 and inlet 51 into the dehumidifying tank 50.

The dehumidification tank 50 has at its top an outlet 52 controlled by a pop-off valve 53 adapted to seal against admission of atmospheric air. The pop-off or blow-down valve 53 is set to open at the low absolute pressure of 18.3 pounds per square inch. With the water jacket outlet pressure corresponding to about 280° F., the liquid pressure in the gas trap 41 will be about 55 pounds per square inch absolute, but regardless of temperature the liquid pressure will always be higher therein than the deaerating valve 53 blow-off pressure. The air collection trap 41 must vent many times into tank 50 before the air-gas pressure is built up to the pressure setting of the valve 53. This gives time (when the engine is at operating jacket temperature) for the cooling of the saturated gas, if and when present, and assures non-synchronous venting, that is, both the tanks 41 and 50 will not be able to vent simultaneously. But simultaneous venting would only mean a small quantity of liquid would be carried over with the air-gas from the tank 41 into tank 50, and this liquid would be returned to the water jacket circulating medium with the accumulated dew.

The tank 50 is perpendicularly splined or finned, both inside and out to obtain the greatest surface area possible, thus decreasing the total interior cubage volume to a minimum. The bottom center outlet 54 is connected directly and in open communication by pipe 55 through the inlet 61 with the dew trap 60. Whenever enough of the dew-liquid is collected to lift the ball-float 62 and its lever 63, the needle-valve 63' will be withdrawn from its seat 64 and the dew liquid will flow through outlet 65, pipe 66, and non-return check valve 66a to the condensate-return line 117 and then enter the liquid circulating medium through the inlet 120 to the gas separator 16 under the very low absolute pressure difference created therein by the liquid-flow. When sufficient dew-liquid is withdrawn from the dew trap 60, the outlet-needle valve is returned to its seat 64 by descent of the float 62 and the trap is again completely sealed against liquid return.

During the first filling with cold water, the condenser is inoperative as a cooling element and condensation to any appreciable quantity will be small indeed but there will be some at pressures of 1 or 2 p. s. i. absolute. After the engine 1 has been running long enough to be operating at the predetermined water-jacket outlet temperature, then the circulation liquid, under pump pressure, enters the water-jacket inlet manifold 2 and leaves the water-jacket outlet 3, flows through water-outlet pipe 4 and valve 5 directly into the liquid-gas-separating drum 6, through pipe 70 and into the liquid-vapor separating element 90. The liquid is at 55 pounds per square inch pressure and has a temperature of 280° in the pipes 4 and 70. Upon entering the separating element 90, the circulating water is forced perpendicularly upward against the inverted, curved surface of cone 91, which has at its inverted-base a circumference great enough to break the liquid water rod into a spray which is forcefully brought into contact at C with the inner surface of the cover-cone 95, all around the circumference thereof. The impact-shock resulting from the velocity-head-force flashes a portion of the liquid into vapor which ascends through the ports 96 while the liquid spray water drops down into the circulating water collected in the tank 6 for return to the engine water circulating pump.

The effect of the flash-shock evaporation is to reduce the temperature of the liquid by the amount corresponding to the equivalent of the weight vaporized at the pressure of the vapor then existing above the liquid surface in the drum 6 and the steam dome 8. The vapor pressure exchange above the liquid surface will be that created by the condensate pump 118 unless the vapor flow into the condenser is throttled by the valve 102 in the steam pipe line between the steam dome 8 and the condenser 110.

The condensate in the condenser 110 is passed out through the special outlet fitting 111, best shown in Figs. 10 and 11, this fitting being placed in the lowest part of the condenser 110 so that the liquid condensate flows to and is collected at this fitting for return to the condensate pump 118. In the bottom section of the condenser housing is a depression into which the condensate flows and will have a high and low liquid water level dependent upon the engine power. The condensate-outlet fitting 111 is entered into the condenser housing in such manner that its "up-stream" end 111i containing a number of circumferential drilled, spirally arranged and equally spaced holes i, will permit the liquid, regardless of quantity and its accumulated height, to flow into the "up-stream" end of the vena-contracta throat T and then, as soon as the condensate pump is started, the condensate liquid flows at high velocity through the throat T as the pressure at it will be less than that created by the condensate return pump.

The high velocity flow through the throat T will cause any air, if present, to enter the throat T with the liquid and be withdrawn faster, clearing the condenser for quicker, more effective action. Moreover, by using the liquid flow to create a lower pressure at the throat T than that produced by the condensate pump, and providing the required size and number of holes i into the upstream cone, neither the liquid nor the air can be trapped, as would be the case if both the liquid and air had to enter a single inlet, because if this single inlet was even with the condenser bottom wall it would be covered by the condensate, all of which would have to be removed before the trapped-air could be removed. If an ordinary pipe were projected up only a small distance, the air, whenever present, would float on top of the water covering the single opening.

From the condenser outlet 111, the condensate may be piped direct to the vacuum pump 118, or as shown in Fig. 1, it may pass to an oil-water heat exchanger 114 wherein the engine oil is brought to the approximate condensate temperature which in arctic ambient air would heat the oil but in Arabia, at desert air temperature, would cool the oil. The oil heat-exchanger is not essential to the engine circulating system operation. Either with or without the exchanger 114, the condensate enters the gear-pump inlet 116 and is discharged into pipe 117 and returned to the coolant directly into the gas separator 16, therein becoming a cold-stream addition to the high temperature circulating coolant and be subjected to the gas separating process the same as the coolant so that all air and gas is removed from the liquid before it can enter the engine water-jacket. The cooling water is now gas-free and the sensible-heat-transfer circuit and condensing heat-dissipation circuit is gas-free by the complete deaeration.

With the circulating water now at high temperature, the vapor-flow into the condenser 110 is throttled to increase the vapor pressure above the liquid surface in drum 6 to 55 p. s. i. absolute, the liquid is forced from the outlet 11 of the drum 6, through pipe 12 to the treating unit 14. In entering the unit 14, the water flows over the anodic-cathodic couple element 15a, entering the chamber 15 horizontally, and the water is always in contact with this couple 15a to be rendered dielectric.

The water, before treatment in the unit 14, contains, together with $O_2$, dissolved carbon dioxide, $CO_2$, which forms with the water carbonic acid, $H_2CO_3$, and this makes the water an acid electrolyte. Conversely, the water may contain calcium bicarbonate, $Ca^{++}+2HCO_3$, and this is also acidic. The couple in the chamber 15 neutralizes the water and thereby makes it dielectric. It is not necessary to neutralize the condensate because it is very pure-water and is dielectric because it is neutral, being neither acidic or alkaline as it contains no free hydrogen ions, $H^+$ nor free hydroxyl ions $OH^-$.

The rods 301 and 304 of the anodic-cathodic couple are completely surrounded by the circulating water in the chamber 15, all the way to the cap 300 to which the cathode is bolted. As shown in Figure 9, when the anode and cathode are completely dry, the electric current created at the joining contact of the two different metals is too weak to jump the distance of the gap at their opposite ends. This is also true when wet with chemically pure distilled water as the electromotive force (E. M. F.) is insufficient to jump the gap. However, when in water which is either acid or alkaline, the water is an electrolyte and galvanic action assists the electric-current flow across the gap-opening between the wetted metal-rod elements. This current flow will increase with the increase of temperature and continue as long as the circulating water remains electrolytic, that is until its pH=7. The connection 304a is provided for current flow instrument testing and determination of the correct gap-opening between the anode and cathode. It should be noted that before the air is detrained from the water, the current flow is from anode to cathode, but after the water is gas-free the electric current is reversed and is from cathode to anode.

To promote the decomposition of an acid or alkaline aqueous solution to a neutral pH, it is only necessary that the voltage of the electrodes be approximately 1.7, the approximate decomposition voltage for aqueous solutions of acids and bases as determined by M. Le Blanc (pages 1014 and 1015, Textbook of Physical Chemistry, 2nd ed., Samuel Glasstone, D. Van Nostrand & Co.). The decomposition voltage simply represents the sum of the potentials that must be obtained by the two electrodes before the rates of the respective ion discharge processes are appreciably greater than the reverse reaction. Thus, knowing the standard reduction potentials of the common metals, the particular metals for the anode and cathode may be easily selected. Therefore, aluminum (−1.276) and mercury (.336) and all metals below aluminum and above mercury in the E. M. F. series, may be used in the anodic-cathodic couple. The E. M. F. values noted herein are those set forth in page 556 of "The Handbook of Chemistry and Physics," sixteenth edition, Hodgman and Lange, 1931.

The neutralized dielectric coolant from the treating unit 14 enters the gas separator 16 through its inlet 16$i$ and flows into the upstream cone U–1 and emerges at high velocity from the throat T–1 through orifice O–1 into throat T–2, and from the outlet O–2 into the low-pressure chamber and upstream cone U–3 and the elongated throat T–3, from outlet O–3 into the expanded downstream cone D–4 which opens through outlet O–4 into a very large expansion chamber C–6, part of which forms another upstream cone U–5 which forms a throat T–5 terminating in the outlet 16$o$, from which the water enters the centripetal gas-liquid separating tank 17. The water entering throat T–1 reduces the absolute pressure in the annulus A, connected to the condensate line inlet 120, and this pressure is further reduced by passage through the throat T–2 and again by passage through the throat T–3, at which a very low absolute pressure (or vacuum) exists. At each low pressure place the soluble gas volume (absorbed by the water originally at 14.696 p. s. i.) expands and leaves the liquid due to the difference in density.

At the outlet O–2 the velocity of the water is so high it enters throat T–3, passes into chamber C–6, and through the throat T–5, as a liquid stream of expanded diameter. The expanded gas starts emergence from the liquid in transition between throats T–1 and T–2 and emerges from the liquid entirely in the larger space of upstream cone U–3 which has at its throat T–3 the lowest pressure and greatest pressure difference between water-inlet pressure at 16$i$ and the outlet O–3. The separated gas cannot remain in the low pressure space U–3 because of its directional flow velocity force and the lower pressure existing in the throat T–3. Therefore, the gas and liquid flow as separate fluids through the throat T–3, the liquid water-rod being surrounding by the gas as a gas annulus having a definite thickness. On entering the rising pressure sections between outlet O–4 and the outlet 16$o$, the time factor for reabsorption of the gas by the liquid is too short, at constant temperature. Furthermore, with increasing coolant temperature, the gas separation is very complete on the first circuit through the separator 16, and even at coolant temperatures of 244° F. no gas will remain in the liquid.

The heating-element 13$a$, in the chamber 13 of the unit 14, is a commercial electric-rod type water-ball immersion heating element. When this heating element is energized and becomes hot, the water in which it is immersed becomes heated with decreased density compared with the colder water in the system when the engine is not running. The heated water ascends the pipe 12 into the tank 6 in which the water level is always maintained, when cold, above the top of the water pipe 4 so that it will always be full when the engine is not running. The heated water entering tank 6 heats the water in tank 6, thereby thermally reducing its density so that from the centerline of pump inlet pipe 20 to the water level in tank 6, the circulating pressure per square inch will be as the difference in the water density on the cold side from the water-level in tank 6 to pump inlet center. This difference of pressure will be sufficient, as the cold liquid descends through pipe 4, through engine 1 to pump 21 and into pipe 20 to cause the less dense water in tank 6 to flow upwardly into pipe 71 and through pipes 70 and 4 into the engine outlet 3 through the water jacket manifold 2, through the water pump 21 and pipe 20, through tank 17, and separator 16 to the unit 14 where it is in contact with the heating element.

The system may also be employed for producing a gas-free dielectric coolant and maintaining it neutral in storage for use in other diesel engines or the like as make-up-water. Such a system is shown in Fig. 4, wherein an exhaust heat recovery boiler 1$a$ is used in place of engine 1, Fig. 1, as the power plant, the boiler 1$a$ having an upper water tank 2$u$ connected with the liquid outlet line 4 and a lower tank 2$l$ connected with the liquid return line 20. Other parts are equivalent to the system shown in Figs. 1 and 3 except as hereinafter mentioned. For purposes of illustration, the tank 6 is shown as provided with water-gauge glass 7′ and automatic water level element 7″. The steam discharge pipe 103 is shown connected directly between the steam dome 8 and condenser 110. The condensate from the condenser is run by pipe 113 to a condensate holding tank 200 which has a bottom outlet 201 controlled by a flow regulating stop cock 202 and connected with a condensate return pipe 203. The tank 200 has a top outlet 209 connected by pipe 210 to a large liquid storage tank 222. The storage tank 222 has a top outlet 212 connected with a pipe 214 containing a non-return valve 213 and connected with the condensate return pipe 203, which has a non-return valve 205 and is connected directly with the condensate return pipe 117.

The water pipe 12, from the tank 6, is connected directly with the pump 206 which in turn, is connected with the separator 16. The neutralizing chamber 15′, containing the anodic-cathodic galvanic couple 15$a$, is interposed in the liquid return line 20, and an immersion heating element 13$a$ is disposed in the gas-free dielectric storage tank 222. Thus, the circulation is thermally reversed, the purpose of which is to keep the gas-free neutral water from freezing, without use of antifreeze material, and also for pre-heating the coolant to enable quick warm-up and instant starting.

The tank 222 has a bottom outlet 215 controlled by a valve 216 and connected to a gear-pump 218, driven by an electric motor 219, the pump 218 having an outlet 221 which may be connected to the make-up inlets 68 or 119 of any other engine for filling or adding make-up water. The coolant pipe 109 of the condenser 110 may be connected with a pump 230, driven by a motor 236, and having an inlet 231 connected with a source of raw water. Make-up water may be supplied to the system at various locations, and may be permanently connected to an external source 81 by a pipe 82 and valve 83. The pipe 82 may be connected by a valve 88 with the connection 67 and also by a branch pipe 84 with the control device 7″ on the separating tank 6.

The pump 206 may be an ordinary centrifugal pump, as indicated in Fig. 4, but preferably this pump is a special pump such as shown in Figs. 12–15. The principal difference in this pump resides in the location of the inlet 206$i$ being disposed peripherally of the housing and the rotor blades 206$b$ move the liquid to the outlet 206$o$ at high entering velocity without impeller blade impact shock, centrifugal-emulsification or cavitation, any one of which would cause flashing either by kinetic energy absorption of pressure drop in the casing. In this pump, when the impeller blades are rotating at a peripheral speed of 6.25 ($V_i$) feet per second the liquid inlet velocity at the tip of each blade will be moving forward exactly at the same velocity as the entering liquid, so that in the vertical plane of forward rotational movement the velocity of the blade tips will be $V_b = V_i$.

The entering angle of the impeller blades to the entering liquid is: $\alpha = 35°$. If the peripherial speed per second of the tip of the blade at moment of contact with the liquid is $V_b l$, then the linear velocity of the blade will be at any other place, $\phi$, and $\phi = V_b(1 - \cos.\alpha)$. From this it is seen there is no kinetic energy loss from the impeller blade because the liquid enters without angular change in flow direction or velocity and therefore without impact shock. Mechanically induced velocity head pressure drop difference does not occur with consequent temperature drop in the liquid causing vaporization. The result obtained is the exact reverse and therefore the entering liquid may now be gradually accelerated quickly to the desired higher velocity and under an increasing pressure to that desired for the water-jacket inlet circulation at any desired inlet pressure.

The invention is also applicable to automotive types of internal combustion engines, as shown in Figs. 5 and 6, and again only the distinctions and variations in the system will be described. For purposes of illustration, the engine 1b is shown connected with an exhaust gas heater 600, such an arrangement being fully disclosed in my U. S. Patent No. 1,937,514. In this system, water may be added by a filler cup 620 in the separating tank 6. A connection 613 is interposed in the pipe 12 between the tank 6 and the treating unit 14 and a pipe 601 is connected between the connection 613 and the heater 600 while a branch pipe 602 extends from the pipe 601 to the engine water-jacket 2b. The return pipe 606 from the heater 600 is connected to the circulating system between the unit 14 and the separator 16.

The separating tank 6 has a second water outlet 507 which is connected by a pipe 506 with the inlet 505 of an oil heat exchanger 500, which has a water outlet 501 connected by pipe 502 with an inlet 503 in the side of the treating unit 14. The engine 1b has a lubricating oil tank 535 and a pipe 533, having a check valve 534, connects the outlet 536 of this tank with the inlet 530 of the exchanger 500, and a pipe 522 connects the exchanger outlet 520 with the inlet 523 of the tank 535. The auxiliary steam pipe 105 has a return pipe 105' which is connected with the condensate return line 113 and the dew from the tank 50 is returned by the pipe 55 to the return pipe 105'. Finally, a pump 206 of the type shown in Figs. 12–15 is coupled between the coolant supply line 29 and the engine water-jacket, this pump preferably being driven from the engine by a drive shaft 623.

In operation, the circulating system is filled with surface water at the filler cup 620 so the tank 6 is half to three-quarters full, and the cup closed and made air-tight. The engine is now started from cold and the engine circulating pump 206 forces water into the engine water-jacket. This water, after effecting sensible heat transfer from the combustion space wetted walls, emerges at higher temperature from the engine outlet manifold and flows to the drum 6, the aqueous vapor ascending and the water descending from tank 6, and returns through the system to the circulating pump. The water at 280° F., or higher, flows into the pump without impact shock and out at the circumferential blade mean velocity. On the main circuit through the separator 16 the water is freed of air and gas.

As the water flows through separator 16, there is a pressure drop so much lower at the condensate inlet 120 that the air flows from the higher pressure in the condenser to the lower pressure in the separator 16. Both the contained and water freed air-gas pass into the water-level actuated trap 41. With cock 140, normally completely closed, the aqueous pressure flow into the condenser 110 must be regulated by partly closing the cock 102 until the desired steam pressure is attained in tank 6.

The circulating water flows into the oil heat exchanger for the purpose of heating the oil in cold regions as the arctic at 65° F. when used in military equipment. The exchanger water returns to the main circulating circuit in the unit 14. The oil is forced through the exchange by the engine oil pump or auxiliary pump if required. At 280° F. the water-jacket heat loss at full power is reduced from 32% total heat of fuel to only 20%.

The heat content of the steam divided into the vehicle interior heaters, by opening cock 140 in the steam heater inlet line 105 and closing steam cock 102 to the condenser, may be insufficient, part of the water is run from the tank 6 by pipe 601 to the exhaust gas heat recovery exchanger 600 which is manually cut into or out of operation by a valve 610, and this heated water is returned to the circulating water from tank 6 by the pipe 606.

Standing idle, the engine liquid circulating circuit may be kept above the freezing point of water by energizing the immersion heater 13a. The thermo-syphon reverse liquid flow takes place from contact with the immersion heater, as previously described.

Although certain specific embodiments of the invention has been shown and described, it is obvious that many modifications thereof are possible. The invention, therefore, is not to be restricted except in so far as is necessitated by the prior art and by the spirit of the appended claims.

I claim:

1. The method of cooling water jackets of engines and the like, comprising providing a cooling system permanently closed against the admission of air, circulating a liquid cooling medium through said system, deaerating said cooling medium, and neutralizing said cooling medium, whereby to provide a gas-free dielectric cooling medium.

2. The method of mechanically degasifying a liquid coolant for engines or the like which comprises separating by pressure differential the soluble gas particles from the liquid coolant and directing the detrained gas and liquid under pressure to a column to permit the gas particles to collect at the top of the column, evacuating the collected gas from the top of the column under the control of the liquid level of the column, and supplying gas-free liquid from the bottom portion of said column to the water jacket of an engine or the like.

3. The method of cooling water jackets of engines or the like, which comprises providing a cooling system in circuit with the water jacket and permanently closed against the admission of air, circulating a liquid cooling medium through said system, maintaining the liquid medium under pressure, separating by pressure differential the soluble gas from the liquid medium, and evacuating the separated gas from the liquid without materially lowering the pressure of said liquid medium.

4. A cooling system for engines or the like, comprising a closed circulating system through the water jacket of the engine, means for maintaining pressure in said system, means in said system for separating by pressure differential the soluble gas from the liquid coolant, means for collecting said gas, and means for evacuating gas from said collecting means without material change of pressure.

5. A cooling system as defined in claim 4 wherein said means for collecting said gas comprises a centripetal tank and said means for evacuating said gas comprises a float actuated valve.

6. A cooling system as defined in claim 5 wherein said evacuating means comprises a separate tank for receiving gas from said valve, a pressure actuated valve in the top of said separate tank for exhausting gas to atmosphere, and a connection between the bottom of said separate tank for returning any liquid to said system.

7. A cooling system as defined in claim 4 comprising means for neutralizing the liquid coolant.

8. A cooling system for engines or the like comprising a closed circulating system through the water jacket of the engine, said system including a reservoir for connection with the outlet of the water jacket to receive cooling fluid from the jacket and permit separation of the liquid and vapor constituents of the cooling fluid, a condenser in communication with said reservoir to receive vapor therefrom, a gas separator in communication with the lower portion of the reservoir to receive liquid therefrom and also in communication with said condenser to receive condensate therefrom, a separation tank in communication with said gas separator to receive liquid and gas particles from said gas separator and to permit raising of the gas particles and settling of the liquid, a chamber at the top of said separation tank to receive the rising gas particles, a float valve controlled outlet in the top of said chamber and arranged to open upon lowering of the liquid level due to gas accumulate in said chamber to exhaust the collected gas particles, and a pump in said system to supply the deaerated liquid from the bottom of said separation tank to the engine water jacket in required quantities.

9. A cooling system as set forth in claim 8 wherein the communication between said reservoir and gas separator comprises a down-pipe from said reservoir and an elbow at the bottom of said down-pipe and connected to said gas separator, and heating means connected under said elbow for initially heating the coolant by reverse convection.

10. A cooling system for engines or the like comprising a closed circulating system through the water jacket of the engine, said system including a reservoir for connection with the outlet of the water jacket to receive cooling fluid from the jacket and permit separation of the liquid and vapor constituents of the cooling fluid, a vapor chamber above and in communication with the top of said reservoir, an excess pressure safety valve in said vapor chamber, a condenser in communication with said vapor chamber, a gas separator in communication with the lower portion of the reservoir to receive liquid therefrom and also in communication with said condenser to receive condensate therefrom, a separation tank in communication with said gas separator to receive liquid and gas particles from said gas separator and to permit raising of the gas particles and settling of the liquid, a float chamber above said separation tank to receive the gas particles rising therefrom, said float chamber being below said reservoir to have a static head of liquid therein, a float valve controlled outlet in the top of said float chamber and arranged to open upon lowering of the liquid level due to gas accumulated in said float chamber to exhaust the collected gas particles, a dehumidification tank in communication with said float valve controlled outlet to receive the gas particles exhausted from said float chamber and collect condensate from said particles, a pressure responsive deaerating valve in the upper portion of said dehumidificaton tank to remove the gas to atmosphere at pressures lower than that maintained in the coolant liquid system by said vapor chamber safety valve, a condensate return line in communication between the bottom of said dehumidification tank and said gas separator, an outlet in the bottom of said separation tank for connection with the inlet of the water jacket of the engine, and a pump in said system to supply the deaerated liquid to the engine water jacket in required quantities.

11. A cooling system for engines or the like comprising a closed circulating system through the water jacket of the engine, said system including a reservoir for connection with the outlet of the water jacket to receive cooling fluid from the jacket and permit separation of the liquid and vapor constituents of the cooling fluid, a vapor chamber above and in communication with the top of said reservoir, an excess pressure safety valve in said vapor chamber, a condenser in communication with said vapor chamber, a gas separator in communication with the lower portion of the reservoir to receive liquid therefrom and also in communication with said condenser to receive condensate therefrom, a separation tank in communication with said gas separator to receive liquid and gas particles from said gas separator and to permit raising of the gas particles and settling of the liquid, a float chamber above said separation tank to receive the gas particles rising therefrom, said float chamber being below said reservoir to have a static head of liquid therein, a float valve controlled outlet in the top of said float chamber and arranged to open upon lowering of the liquid level due to gas accumulated in said float chamber to exhaust the collected gas particles, a dehumidification tank in communication with said float valve controlled outlet to receive the gas particles exhausted from said float chamber and collect condensate from said particles, a pressure responsive deaerating valve in the upper portion of said dehumidification tank to remove the gas to atmosphere at pressures lower than that maintained in the coolant liquid system by said vapor chamber safety valve, a liquid return trap in communication with the bottom of said dehumidification tank to collect condensate therefrom, a float valve controlled outlet in said trap and in communication with said gas separator, an outlet in the bottom of said separation tank for connection with the inlet of the water jacket of the engine, an anodic-cathodic couple in said system to neutralize the coolant liquid, and a pump in said system to supply the deaerated neutral liquid to the engine water jacket in required quantities.

12. A cooling system for engines or the like comprising a closed circulating system through the water jacket of the engine, said system including a reservoir for connection with the outlet of the water jacket to receive cooling fluid from the jacket and permit separation of the liquid and vapor constituents of the cooling fluid, a vapor chamber above and in communication with the top of said reservoir, an excess pressure safety valve in said vapor chamber, a condenser in communication with said vapor chamber, a liquid supply line extending downwardly from the bottom of said reservoir, a T-connection at the bottom of said line with the stem of said connection at right angles to said line, a vena-contracta gas separator in communication with the stem of said connection to receive liquid from said reservoir and also in communication with said condenser to receive condensate therefrom, a centripetal separation tank in communication with said gas separator to receive liquid and gas particles from said gas separator and to permit raising of the gas particles and settling of the liquid, a float chamber above said separation tank to receive the gas particles rising therefrom, said float chamber being below said reservoir to have a static head of liquid therein, a float valve controlled outlet in the top of said float chamber and arranged to open upon lowering of the liquid level due to gas accumulated in said float chamber to exhaust the collected gas particles, a dehumidification tank in communication with said float valve controlled outlet to receive the gas particles exhausted from said float chamber and collect condensate from said particles, a pressure responsive deaerating valve in the upper portion of said dehumidification tank to remove the gas to atmosphere at pressures lower than that maintained in the coolant liquid system by said vapor chamber safety valve, a liquid return trap in communication with the bottom of said dehumidification tank to collect condensate therefrom, a float valve controlled outlet in said trap and in communication with said gas separator, an outlet in the bottom of said separation tank for connection with the inlet of the water jacket of the engine, an anodic-cathodic couple in said system to neutralize the coolant liquid, a pump in said system to supply the deaerated neutral liquid to the engine water jacket in required quantities, and a heater connected with the third opening of said T-connection for preheating the liquid by reverse convection.

References Cited in the file of this patent

UNITED STATES PATENTS

| | | |
|---|---|---|
| 1,311,529 | Muir | July 29, 1919 |

FOREIGN PATENTS

| | | |
|---|---|---|
| 816,359 | France | Aug. 6, 1937 |
| 500,953 | Great Britain | Feb. 16, 1939 |